United States Patent [19]

Church et al.

[11] 4,303,479
[45] Dec. 1, 1981

[54] DISTILLATION SEPARATION METHOD

[75] Inventors: Shirley L. Church, E. Amherst; Loren M. Hilts, Niagara Falls, both of N.Y.

[73] Assignee: The Goodyear Tire & Rubber Company, Akron, Ohio

[21] Appl. No.: 99,306

[22] Filed: Dec. 3, 1979

Related U.S. Application Data

[62] Division of Ser. No. 840,343, Oct. 7, 1977, Pat. No. 4,201,628.

[51] Int. Cl.³ .......................... B01D 3/38; C08F 6/04
[52] U.S. Cl. ........................................ 203/89; 203/92; 159/13 C; 159/15; 159/49; 202/234; 202/236; 528/500; 528/501
[58] Field of Search ...................... 203/89, 96, 72, 92, 203/93, 97; 159/13 R, 15, 13 C, 49; 261/114; 528/500, 501; 202/236, 158, 234, 205

[56] References Cited

U.S. PATENT DOCUMENTS

| 1,771,561 | 7/1930 | Gensecke | 203/92 |
| 2,759,883 | 8/1956 | Thurman | 203/92 |
| 3,003,930 | 10/1961 | Pugh et al. | 202/158 |
| 3,436,319 | 4/1969 | VonHorst et al. | 203/96 |
| 3,620,283 | 11/1971 | Brown | 203/89 |
| 3,737,378 | 6/1973 | Mori et al. | 203/92 |
| 3,841,381 | 10/1974 | Dassesse | 159/15 |
| 4,086,414 | 4/1978 | Hornbaker et al. | 528/501 |

Primary Examiner—Wilbur L. Bascomb, Jr.
Attorney, Agent, or Firm—J. D. Wolfe

[57] ABSTRACT

This invention relates to a distillation column for removing vinyl chloride monomer or other volatile material from an emulsion, suspension or dispersion containing such material. The apparatus comprises a column in which a series of inverted cones are mounted. The dispersion or emulsion is pulled downwardly over the cones and steam is fed into the column through sparges and flows upwardly against the descending stream of material. The low boiling materials are distilled out and recovered for reuse. The strips emulsion or dispersion are collected at the bottom of the column.

6 Claims, 6 Drawing Figures

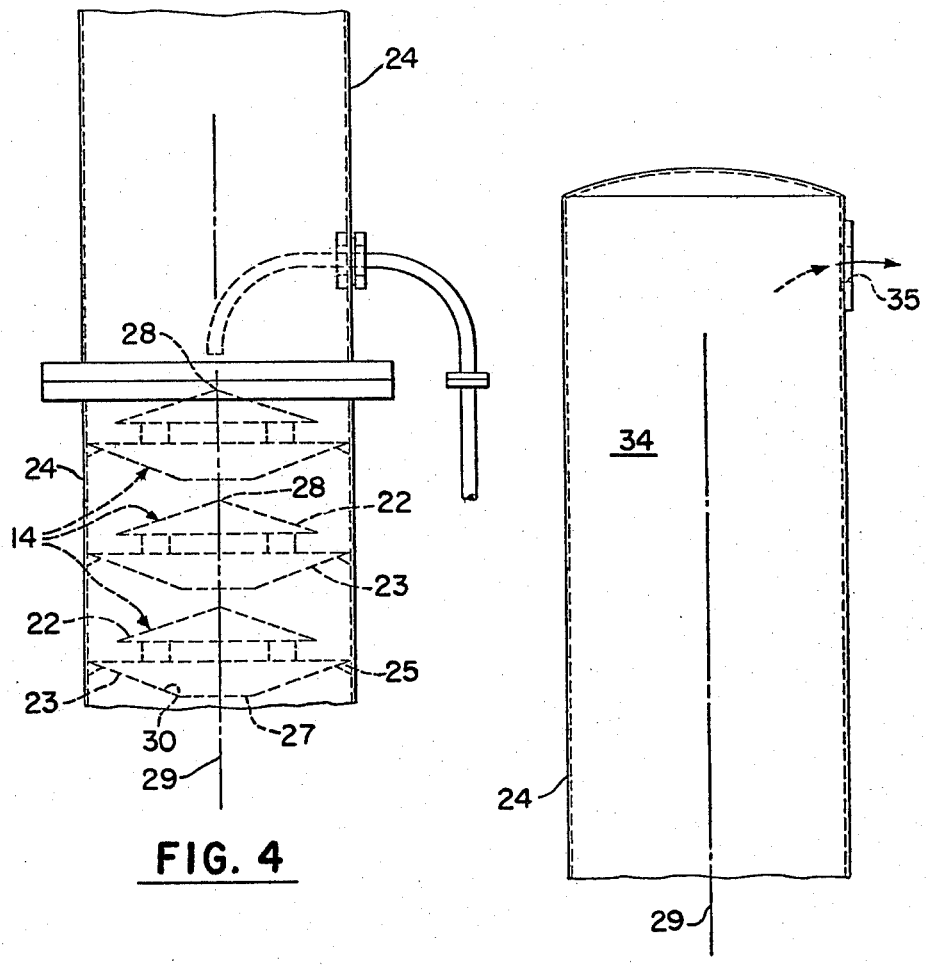

DISTILLATION SEPARATION METHOD

This is a division of application Ser. No. 840,343 filed Oct. 7, 1977 now U.S. Pat. No. 4,201,628.

This invention relates to a column suitable for stripping low boiling materials from higher boiling materials and to the method of operating said column. More particularly, this invention relates to a continuous stripping column for removing monomers from polymerization mixtures and to the method of operating said column.

Steam has been utilized for a number of years to strip low boiling monomers from polymerization emulsions, suspensions and dispersions, but unfortunately, using previously existing techniques, it is quite time consuming to remove all the monomer from the polymerization slurry and in most cases a partial degradation of the polymer results. Especially is this so where the monomer is known to be a carcinogen and the amount of monomer allowed in the emulsion, suspension or dispersion is extremely low in the order of less than 100 parts per million (ppm) and preferably less than 20 ppm.

The object of this invention is to provide an efficient column for stripping monomers from polymerization emulsions, suspensions and dispersions with steam, which will not result in degradation of the polymer or loss of physical performance characteristics and also to provide an improved method of operating said steam stripping columns.

The nature of this invention may be more readily understood and appreciated as well as its advantages illuminated by reference to the accompanying drawings wherein FIG. 1 is a schematic cross-sectional view through a vertical stripping column;

FIG. 4 is a detailed view of the column showing the feed slurry mechanism relative to each of the plate assemblies;

FIG. 5 is a cross-sectional view of the upper part of the column showing the vapor separation section.

Figure 1:
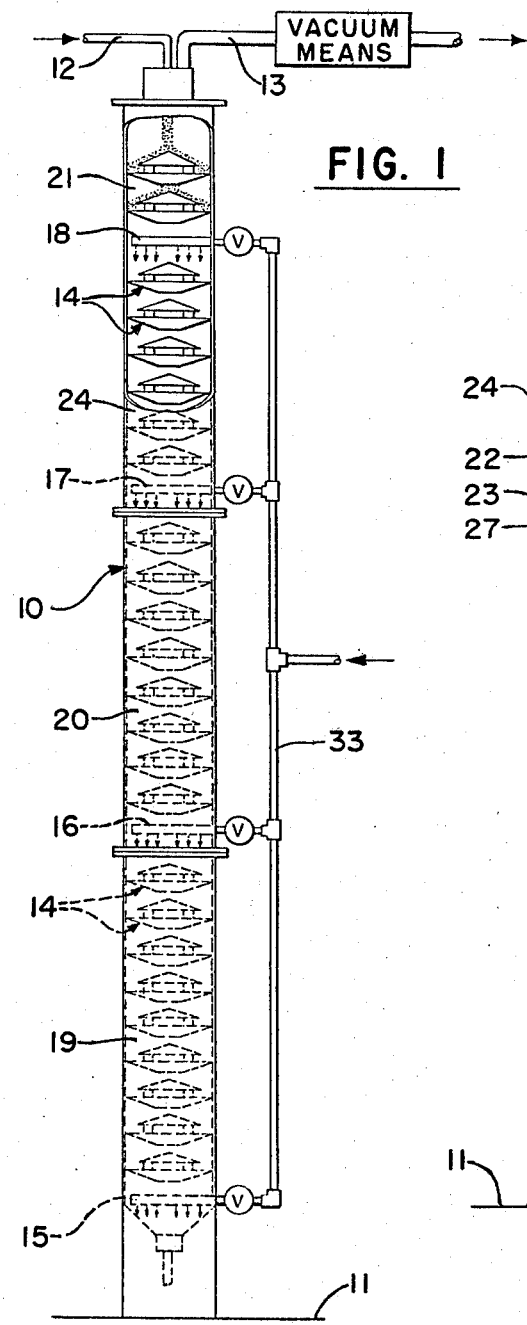

Reference to FIG. 1 shows the elongated cylindrical column 10 resting on a foundation 11 and having a line 12 for feeding the slurry to the column and a vapor take-off line 13. A series of plate assemblies 14 mounted one above the other in the column controls the flow of the slurry feed downward through the tower and also controls the flow of the steam and vapor upward within the tower. In the bottom of the tower immediately below the last cone plate assembly is positioned a steam sparger assembly 15 which may be more readily seen and understood by reference to FIG. 6. Also, it should be noted that in FIG. 1 additional steam sparger assemblies 16, 17 and 18 are positioned beneath the cone plate assembly in the intermediate 19, 20 and top 21 sections of the column to aid in maintaining a uniform temperature gradient throughout the column.

Figure 2:
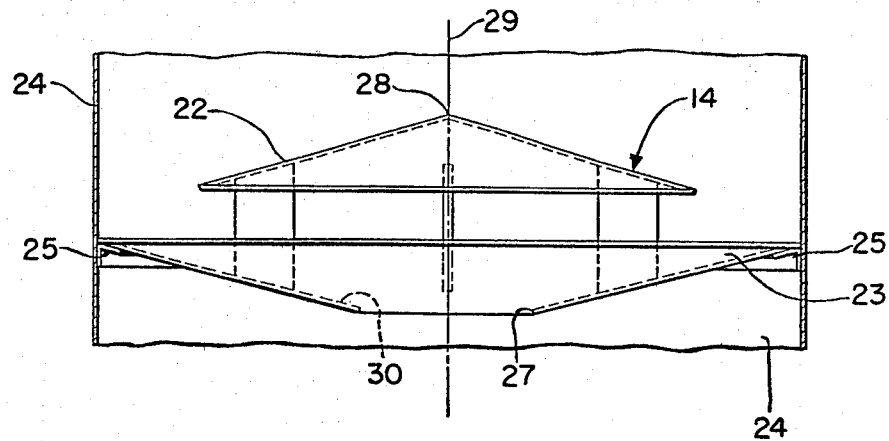
FIG. 2 is an enlarged detailed cross-sectional view through the cone plate assembly of the column.

Referring to FIG. 2, it will be noted that the plate assembly consists of a top cone plate 22 and a bottom or a lower conical plate 23; that the bottom conical plate 23 is tightly sealed against the side walls of the column, for example, a gasket material 25 such as Teflon TM or Viton TM can be used between the cone and sidewall to seal between the outer periphery of the bottom conical plate and the sidewalls of the column and to serve as an expansion joint. It is also possible to use cylindrical vertical insert sections between plates so that the bottom plate is sandwiched between the cylindrical sections and a seal is formed. The lower conical section 26 of the bottom cone has been removed to give an opening through the bottom cone section, essentially positioned within the center of the cone. This opening is sized to permit the feed material to drain from the top of the bottom conical plate downward to the top of the cone plate underneath said bottom conical plate and also supplies sufficient vapor space to accommodate the passage of the volatilized material and steam upwards within the column without effecting an appreciable pressure differential from above and below each plate. The top cone plate of each cone plate assembly is positioned a nominal distance (depending on the desired vapor flow rate) above its bottom cone plate and preferably is separated by support members projecting upward from its bottom cone plate to position the apex 28 of the top cone within the center line 29 of the column. Since the top cone is of a smaller diameter than the bottom cone, it will be readily apparent that the slurry dropping on the top of the top cone will flow down the slopes of the cone, the slope being dependent on the flow characteristics of the emulsion, suspension, or dispersion and drop off onto the top surface 30 of the bottom cone plate and will flow down the top surface of the bottom cone plate until it comes to the opening 27 of the bottom conical plate and will drop onto the top of the cone plate immediately below the opening.

The advantage to a system of this type is that it allows for redistribution of flow evenly throughout the column in spite of any frothing or foaming which may occur on a given plate due to rapid vaporization of the low boiling component of the feed.

It also permits operation of the column over a wide range of emulsion, suspension or dispersion flow rates without modification of the plate assembly. Generically, emulsion, supension or dispersion of polymer or other high boiling organics, including essentially solid particles, are called feed stock.

It also provides a flow pattern for the emulsion, suspension or dispersion, which is free from dead spots, where material can be held up within the column. This prevents longer than desired residence times which can result in polymer or organic compound degradation and loss of physical properties. Also, this leads to the production of a finished product having exceptionally low monomer content and a low heat history.

The conical plate design and its resulting free flow pattern also reduces or eliminates costly shutdowns for cleaning polymer build-up from surfaces in contact with the emulsion, suspension, or dispersion.

Figure 3:
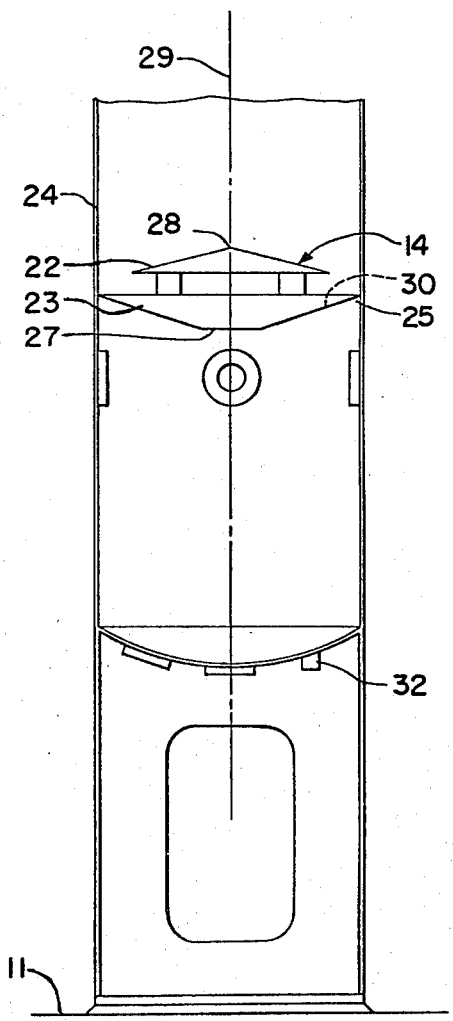
FIG. 3 is a more detailed view in partial section of the lower part of the column of FIG. 1.

Referring again to FIG. 1 it should be noted that the feed stock is pumped onto the top of the top cone plate within the column and then flows downward along the slopes of the top cone plate to drop on the top surface of the bottom cone plate immediately below it where it flows to the next successive cone plate assembly therebelow. This process is repeated until the feed reaches and flows through the opening of the bottom cone plate of the cone plate assembly to the accumulation section 31 seen best in FIG. 3 positioned immediately below the last cone plate assembly. Generally, it is preferred that the columns have at least ten plate assemblies per column.

With certain suspension or dispersion materials it is often desirable to provide the lower section or accumulative section with agitation to maintain the solids in suspension until they can be pumped or drained off through the outlet 32 from this section. These agitators may be of any of the well-known types, such as paddle or scraped wall types.

With the emulsion, suspension, or dispersion being fed to the column, it is desirable that steam at temperatures which will not result in polymer degradation be fed through the manifold 33 from which it is then fed into the column through the spargers identified by Nos. 15, 16, 17 and 18, having valve means in the line to regulate steam flow and hence temperature gradient of the column. As the emulsion, suspension or dispersion flows down through the column, it is contacted by the rising steam from each of the spargers and the steam volatilizes and drives off the low boiling monomers until the material flowing off the last cone plate assembly is essentially free of the low boiling monomer.

Reference to FIG. 1 as well as FIG. 5 will show that the top 34 of the column is a vapor disengaging section and that this section is connected to a vacuum pump (not shown) through opening 35 and a line (not shown) that pulls off the volatile materials and these are passed through a condensing system (not shown) to convert the vapors, usually monomer and steam, to a liquid. Then the water and liquid monomer are separated for reuse in the well-known manner. Alternately the non-condensed vapors can be fed to the boiler or a flare.

Figure 6:
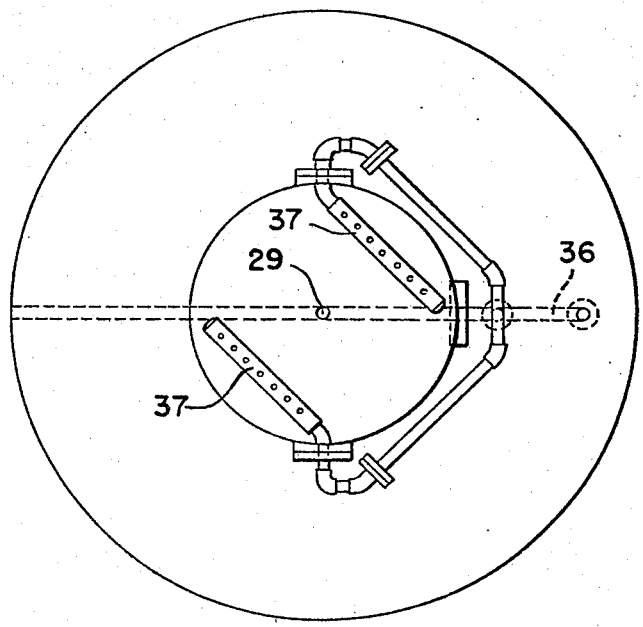
FIG. 6 is a view in greater detail of the sparger system utilized in the column.

The details of the sparger systems are seen best in FIG. 6 where the steam line 36 divides to run around to each side of the bottom plate to a set of twin sparger lines 37 that directs the live steam downward into contact with the vapors rising from the top of the plate below. All vapors then rise and eventually pass through the bottom cone opening near the sparger line.

The openings in the steam sparge are directed downward so that any emulsion, suspension, or dispersion which splashes as it exits the plate above will not cover and plug them.

The openings in the steam sparge are sized to obtain the desired steam velocity throughout the column and to maintain the temperature of the vapor at a point that prevents excessive condensation of the steam which will dilute the slurry.

Generally, where the multiple component mixture is a vinyl chloride polymerization dispersion of either the bulk or aqueous type, the temperature gradient from top to bottom of the column can vary from about 50° to nearly 100° C. but at the lower temperature the partial pressure of the vinyl chloride monomer would be lower than at the higher temperatures. Therefore, the column efficiency would be less. It is therefore preferred that the feed to the column be nearer 80° C. than 50° C. and the column temperature at the bottom be near 90° C. with better results being obtained at 95° to 98° C. with less water condensing to dilute the material.

As this invention is applicable to remove low boiling components from multiple component mixtures, it should be apparent the low boiling component can be an olefin of 2 to 10 carbon atoms such as the well known vinyl chloride, acrylonitrile and the usual alpha-olefins. These olefins are known to be homo or copolymerizable to give polymers or copolymers that are present as solutions, solids, emulsions or dispersions in the polymerization mixture which can contain water or other diluents.

It is well known that the viscosities of these multiple component mixtures can vary from relatively thin to near thixotropic in nature depending on the diluent and amount of solids present. Generally, it is desirable to regulate the temperature of the mixture as it flows downward over the series of incline surfaces to give a flowing film contact with the surface of a few minutes, preferably one to two minutes, to thereby reduce the heat history of the polymer.

The rate of flow over the incline surfaces can be further controlled by inclining the surfaces at angles within the range of 10 to 30, and preferably 15 to 25 degrees from the horizontal, depending on the viscosities and solid content of the feed stock. In extreme cases the polymerization mixture, for instance, may be essentially vinyl chloride monomer as the diluent in the polyvinyl chloride particles that flow over the surface as pellets or particle agglomerates.

Usually, it is preferred to adjust the solid content of the feed stock to control the flow characteristics of the material. Generally, with vinyl chloride dispersions feed, the cone plates are inclined at 15 degrees to the horizontal.

A column constructed in the manner shown in the drawings does not have a liquid level in the sense the term is used in weir plate columns, therefore there are no places for the feed material to hold up. Consequently, if the column tends to become upset on one cone surface, the free fall to the next surface and distribution of the apex of the cone has a self-correcting effect until the column is so full it is being run under flooded conditions. Under flooded conditions there is no free vapor space in the tower for the low boiling monomer to vaporize from the surface of the flowing liquid or layer on the inclined surface.

Although this column has been described as having a steam sparge, it should be appreciated that other heat means could be used where water would be deleterious. For instance, a hydrocarbon such as butane-pentane mixture could be used to advantage with a bulk polymerization mixture.

In general operation the vacuum pump on the vacuum to the top section of the column will be operated at less than 10 inches of mercury as this will prevent the feed from foaming vigorously. Initially, during start-up, 2 to 3 inches of mercury gives easy control with the vacuum being increased as steady state operation is reached without excess foaming in the top section.

While certain representative embodiments and details have been shown for the purpose of illustrating the invention, it will be apparent to those skilled in this art that various changes and modifications may be made therein without departing from the spirit or scope of the invention.

We claim:

1. A method of removing a low boiling component from a multiple component mixture in a system comprising removing at least a major amount of the low boiling component from said mixture by reducing pressure on said mixture with the mixture at a temperature sufficient to yield a low boiling component partial pressure of at least 50 mm. of mercury to decrease concentration of the low boiling component in the other component to enrich the other component, moving said enriched other component over a series of inclined surfaces as a flowing layer to expose the upper surface of said layer to a free vapor space, allowing each layer from each inclined surface to free fall from said surface while being contacted with hot vapors flowing in a direction opposite to the flow of said layer, controlling the temperature of the moving layer near the volatilization point of said low boiling component, by injecting steam into the free vapor space to contact said layer, removing the counter flowing vapors from the system by a means at a pressure less than the pressure on said system, and removing the more concentrated mixture from said system.

2. The method of claim 1 wherein the low boiling component is a monomer in a multiple component mixture comprising a polymerization mixture.

3. The method of claim 1 wherein the low boiling component is an olefin of 2 to 10 carbon atoms and the multiple component mixture is a polymerization mixture resulting from the homo or copolymerization of said olefin.

4. The method of claim 1 wherein the multiple component mixture is a dispersion of an olefin polymerization mixture.

5. The method of claim 1 wherein the dispersion is an aqueous one.

6. The method of claim 1 wherein the multiple component mixture is a vinyl chloride polymerization mixture.

* * * * *